US011292300B2

(12) United States Patent
Balistreri et al.

(10) Patent No.: US 11,292,300 B2
(45) Date of Patent: Apr. 5, 2022

(54) PORTED WHEEL HUB ASSEMBLY AND THE TIRE INFLATION SYSTEM MADE THEREWITH

(71) Applicant: DANA AUTOMOTIVE SYSTEMS GROUP, LLC, Maumee, OH (US)

(72) Inventors: Lucas A. Balistreri, Bowling Green, OH (US); Jason M. Sidders, Perrysburg, OH (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 239 days.

(21) Appl. No.: 16/478,322

(22) PCT Filed: Jan. 17, 2018

(86) PCT No.: PCT/US2018/014051
§ 371 (c)(1),
(2) Date: Jul. 16, 2019

(87) PCT Pub. No.: WO2018/136513
PCT Pub. Date: Jul. 26, 2018

(65) Prior Publication Data
US 2019/0366783 A1    Dec. 5, 2019

Related U.S. Application Data

(60) Provisional application No. 62/513,671, filed on Jun. 1, 2017, provisional application No. 62/447,345, filed on Jan. 17, 2017.

(51) Int. Cl.
*B60C 23/00* (2006.01)
(52) U.S. Cl.
CPC .. *B60C 23/00318* (2020.05); *B60C 23/00372* (2020.05); *B60C 23/00381* (2020.05); *B60C 23/00354* (2020.05); *B60C 23/00363* (2020.05)

(58) Field of Classification Search
CPC ............ B60C 23/003; B60C 23/00318; B60B 27/0026; B60B 27/0073; B60B 27/0078
See application file for complete search history.

(56) References Cited

U.S. PATENT DOCUMENTS

| 4,431,043 A | 2/1984 | Goodell |
| 4,434,833 A | 3/1984 | Swanson |

(Continued)

FOREIGN PATENT DOCUMENTS

| DE | 102014219981 | 4/2016 | |
| FR | 2895470 A1 * | 6/2007 | ........... B60C 23/003 |

(Continued)

OTHER PUBLICATIONS

Machine Translation of JP 2008239025 A, dated Oct. 9, 2008, 8 pages (Year: 2008).*

(Continued)

*Primary Examiner* — S. Joseph Morano
*Assistant Examiner* — Emily G Castonguay
(74) *Attorney, Agent, or Firm* — McCoy Russell LLP

(57) ABSTRACT

A wheel hub assembly having a non-rotating outer bearing flange and an inner bearing flange disposed at least partially concentrically within the outer bearing flange. At least one rolling element is disposed radially between the outer bearing flange and the inner bearing flange. A port is disposed in the outer bearing flange, and a first conduit is disposed through the outer bearing flange in fluid communication with the fluid port. A second conduit is disposed through the inner bearing flange, wherein the second conduit is in fluid communication with the first conduit. A rotating spindle is disposed at least partially through the inner bearing flange, and the spindle is coupled for rotation with the inner bearing flange.

14 Claims, 15 Drawing Sheets

(56) References Cited

U.S. PATENT DOCUMENTS

| | | | |
|---|---|---|---|
| 4,804,027 | A | 2/1989 | Runels |
| 5,979,526 | A | 11/1999 | Chamoy |
| 6,145,558 | A | 11/2000 | Schmitz |
| 6,976,789 | B2 * | 12/2005 | Pilone ................ F16C 33/7886 384/486 |
| 7,255,481 | B2 * | 8/2007 | Mermoud ............... B60B 27/00 152/417 |
| 7,625,127 | B2 * | 12/2009 | Foti ...................... B60C 23/003 384/484 |
| 8,616,254 | B2 | 12/2013 | Kelley |
| 8,915,274 | B2 | 12/2014 | Eschenburg |
| 9,409,449 | B2 * | 8/2016 | Cis ........................ B60C 23/003 |
| 9,469,165 | B2 | 10/2016 | Hibbler |
| 9,604,509 | B2 | 3/2017 | Tsiberidis |
| 9,701,164 | B2 | 7/2017 | Hoeldrich |
| 2012/0067482 | A1 | 3/2012 | Stech |

FOREIGN PATENT DOCUMENTS

| | | | | |
|---|---|---|---|---|
| JP | 2000255228 | | 9/2000 | |
| JP | 2006088809 | A * | 4/2006 | ........... B60C 23/003 |
| JP | 2008239025 | | 10/2008 | |
| JP | 2009073252 | A * | 4/2009 | ........... B60C 23/003 |

OTHER PUBLICATIONS

European Patent Office, International Search Report and Written Opinion issued in International Application No. PCT/US2018/014051, dated Apr. 6, 2018, 12 pages, Rijswijk Netherlands.

* cited by examiner

US 11,292,300 B2

PORTED WHEEL HUB ASSEMBLY AND THE TIRE INFLATION SYSTEM MADE THEREWITH

RELATED APPLICATIONS

The present application claims the benefit to U.S. Provisional Application No. 62/447,345 filed on Jan. 17, 2017, and to U.S. Provisional Application No. 62/513,671 filed on Jun. 1, 2017, each of which is incorporated herein by reference in its entirety.

BACKGROUND

The present disclosure relates to tire inflation systems and more particularly to a wheel hub assembly utilized in a tire inflation system.

Tire inflation systems for vehicles provide a vehicle the versatility of adjusting tire pressures while the vehicle is stationary or in motion. For example, the tire pressure of one or more wheel assemblies in fluid communication with a tire inflation system may be decreased to increase tire traction, or increased to reduce rolling resistance and increase the vehicle's fuel efficiency and tire life-span. Furthermore, tire inflation systems increase a vehicle's maneuverability over differing terrains, and increase a vehicle's mobility through varying environmental conditions. Additionally, tire inflation systems reduce maintenance requirements.

Tire inflation systems communicate pressurized fluid to a wheel assembly. Conventional tire inflation systems are limited by their package size. In view of the above, there remains a need for a tire inflation system operable in a decreased package size.

SUMMARY

The presently disclosed subject matter describes a wheel hub assembly having a non-rotating outer bearing flange and an inner bearing flange disposed at least partially concentrically within the outer bearing flange. The wheel hub assembly also includes at least one rolling element disposed radially between the outer bearing flange and the inner bearing flange. A port is disposed in the outer bearing flange, and a first conduit is disposed through the outer bearing flange in fluid communication with the fluid port. A second conduit is disposed through the inner bearing flange, wherein the second conduit is in fluid communication with the first conduit. Further, a rotating spindle is disposed at least partially through the inner bearing flange, and the spindle is coupled for rotation with the inner bearing flange.

BRIEF DESCRIPTION OF THE SEVERAL VIEWS OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION OF THE EMBODIMENTS

Figure 1:
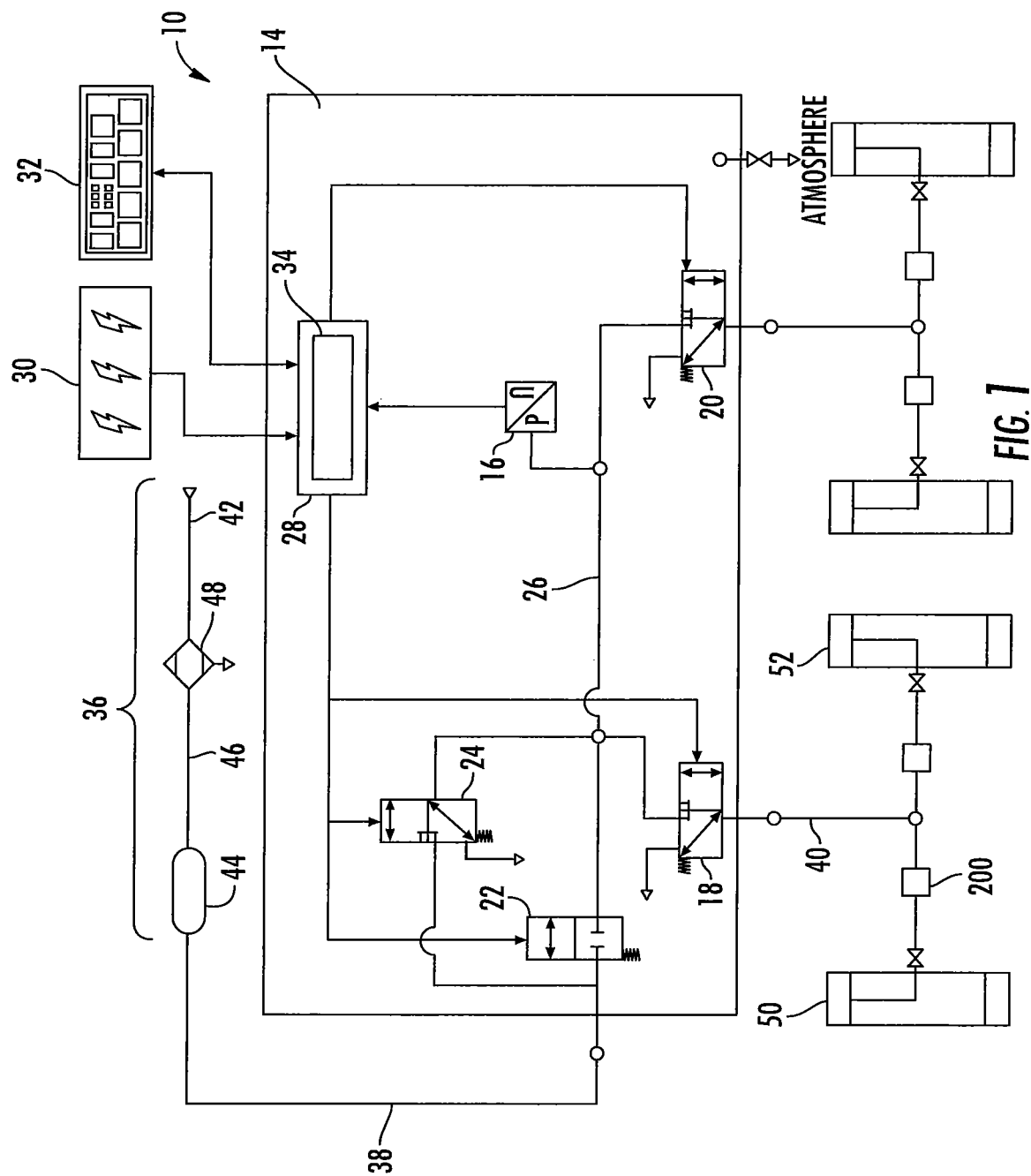
FIG. 1 depicts a schematic view of a tire inflation system according to an embodiment of the presently disclosed subject matter.

It is to be understood that the invention may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Embodiments of a tire inflation system 10 are described below. The tire inflation system 10 may be a central tire inflation system (CTIS) for a compact or mid-size sport utility vehicle. In addition, the tire inflation system 10 described herein may have applications in both light duty and heavy duty vehicles, and for passenger, commercial, and off-highway vehicles. It would be understood by one of ordinary skill in the art that the tire inflation system 10 has industrial, locomotive, military, agricultural, and aerospace applications.

The tire inflation system 10 is described herein with reference to a pressurized fluid such as, for example, air. The tire inflation system 10 may have inflate and/or deflate capability to allow a tire pressure to be increased and/or decreased.

As illustrated in FIG. 1, the tire inflation system 10 may comprise a control unit 14. The control unit 14 comprises a pressure sensor 16 for measuring the pressure of air. In an embodiment, the control unit 14 also comprises a plurality of valve assemblies 18, 20, 22, 24, which may be of the solenoid variety, and a first control unit conduit 26 for controlling the flow of, and directing, air through the system 10.

It will be understood by those skilled in the art that the control unit 14 may comprise a mechatronic control unit (MCU) or a pneumatic control unit (PCU), but is not limited thereto.

The control unit 14 also comprises an electronic control portion 28. The electronic control portion 28 may receive input signals from the pressure sensor 16, a power supply 30 and one or more additional sensors (not depicted) such as, for example, a load sensor and a speed sensor. The electronic control portion 28 may also receive input signals from an operator control device 32. The electronic control portion 28 may include a microprocessor 34 operating under the control of a set of programming instructions, which may also be referred to as software. The electronic control portion 28 may include a memory (not depicted) in which programming instructions are stored. The memory can also store identification codes, tire pressure records and/or user inputs over a period of time.

The electronic control portion 28 may output signals to the valve assemblies 18, 20, 22, 24 to open or close the valve assemblies 18, 20, 22, 24. The electronic control portion 28 may also output signals to a display device (not depicted). The display device may be included as a part of the operator control device 32 or may be included in a freestanding device.

The control unit 14 selectively communicates with an air supply 36 via an air supply circuit 38. The pressure sensor 16 measures the pressure of the air supply 36 via the air supply circuit 38 and the first control unit conduit 26. The control unit 14 may also comprise a control valve assembly 24. The control valve assembly 24 is provided with an orifice (not depicted) which is smaller than the orifice of the supply valve assembly 22 and is utilized to provide a bleed of air from the air supply 36 to a fluid control circuit 40. In an embodiment, the supply valve assembly 22 and control valve assembly 24 are of the solenoid variety.

The air supply 36 is utilized to check the tire pressure and, if needed, increase and/or decrease the tire pressure. The air supply 36 comprises an air compressor 42 attached to the vehicle. In an embodiment, the air supply 36 also comprises a reservoir 44 such as, for example, a wet tank. The compressor 42 is in fluid communication with the reservoir 44 via a supply conduit 46. The air compressor 42 supplies pressurized air to the reservoir 44 for storage therein. Pressurized air from the air supply 36 is provided to the air supply circuit 38 via the reservoir 44. In certain embodiments, a drier 48 is provided for removing water from the air supply 36. A filter (not depicted) may also be interposed in the air supply circuit 38 or the supply conduit 46.

The control unit 14 is also selectively in fluid communication with the fluid control circuit 40. The fluid control circuit 40 is utilized to provide fluid communication between the control unit 14 and one or more tires 50, 52. In an embodiment, fluid communication between the control unit 14 and fluid control circuit 40 is controlled by opening or closing a channel valve assembly 18.

Each tire 50, 52 contains air at a certain pressure which will hereinafter be referred to as tire pressure. In an embodiment, the tire pressure is equal to a target tire pressure. The target tire pressure can be selected to be a desired pressure. After the target tire pressure is selected, it is programmed into the control unit 14. If it is determined that the tire pressure is less than the target tire pressure, the tire pressure can be increased. If it is determined that the tire pressure is greater than the target tire pressure, the tire pressure can be decreased. The tire inflation system 10 will be described below with reference to the tire pressure of one tire 50. However, the tire inflation system 10 may at certain times be in fluid communication with a plurality of tires.

Figure 2:
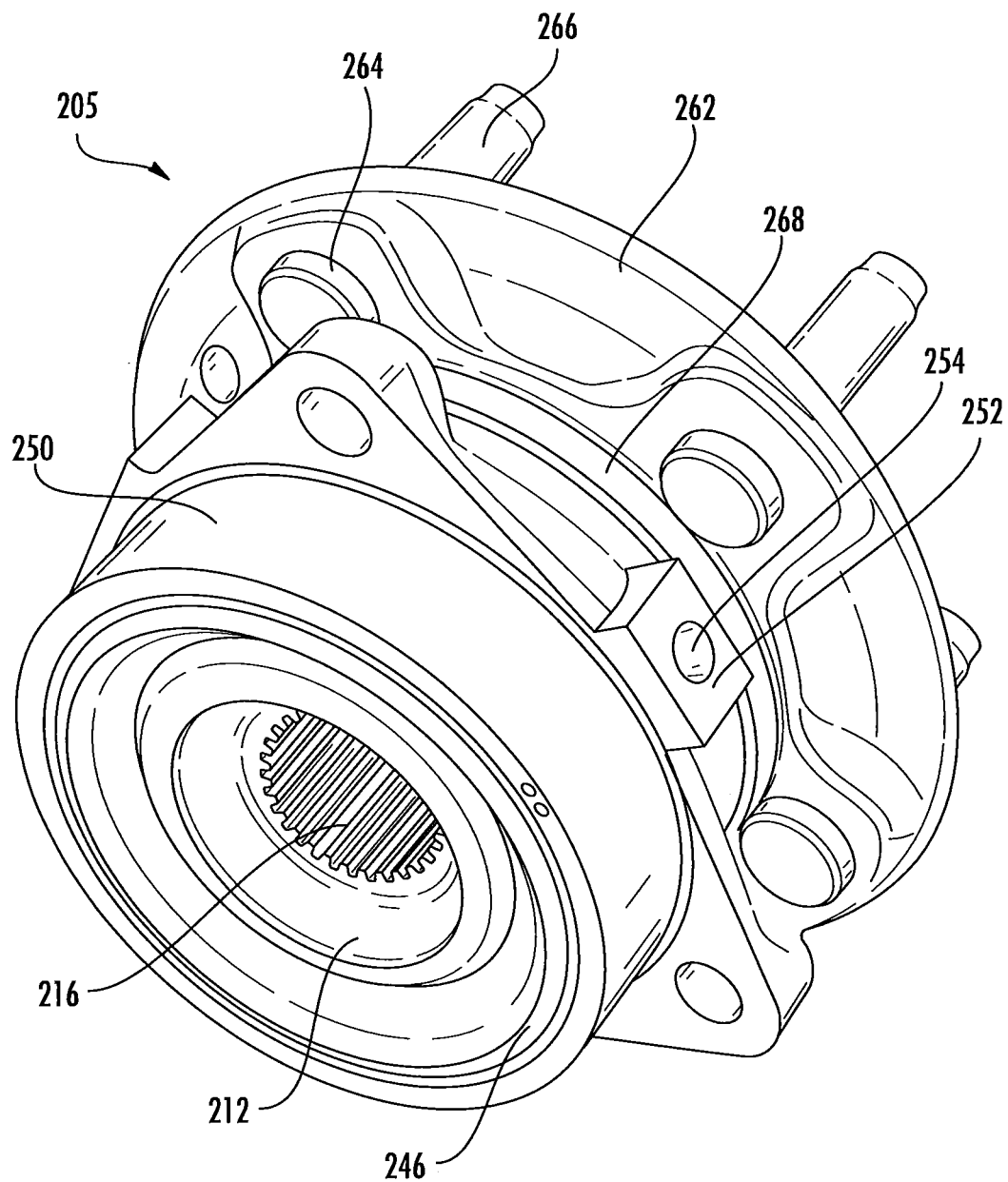
FIG. 2 is a perspective view of an embodiment of a wheel hub assembly of the tire inflation system of FIG. 1.

The tire inflation system 10 further comprises a wheel end assembly 200. The wheel end assembly 200 is associated with the tire 50. The wheel end assembly 200 is utilized to transfer pressurized air between portions of the tire inflation system 10. As illustrated in FIG. 2, in an embodiment, the wheel end assembly 200 comprises a wheel hub assembly 205.

Figure 3:
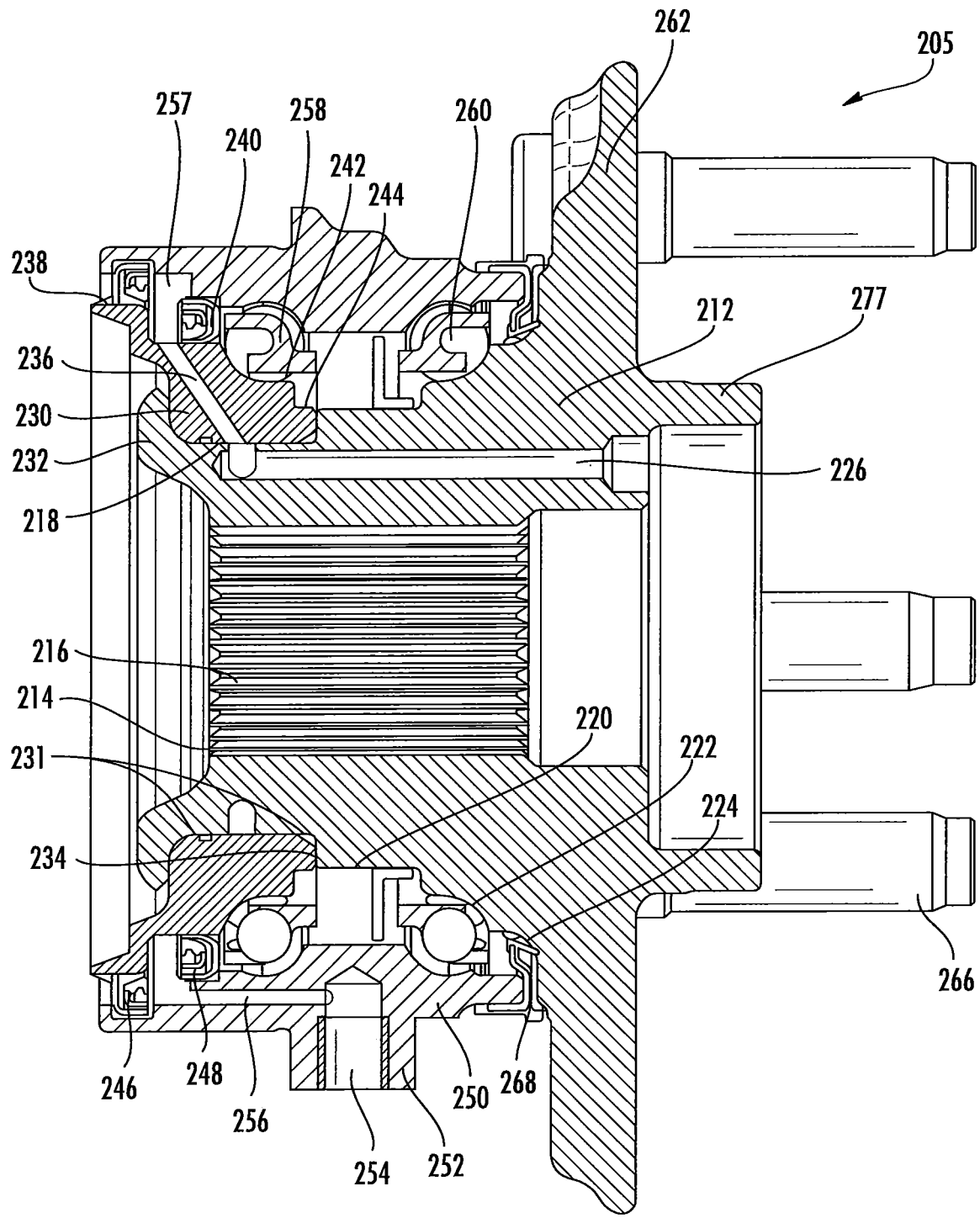
FIG. 3 is a cross-sectional view the wheel hub assembly of FIG. 2.
Figure 4:
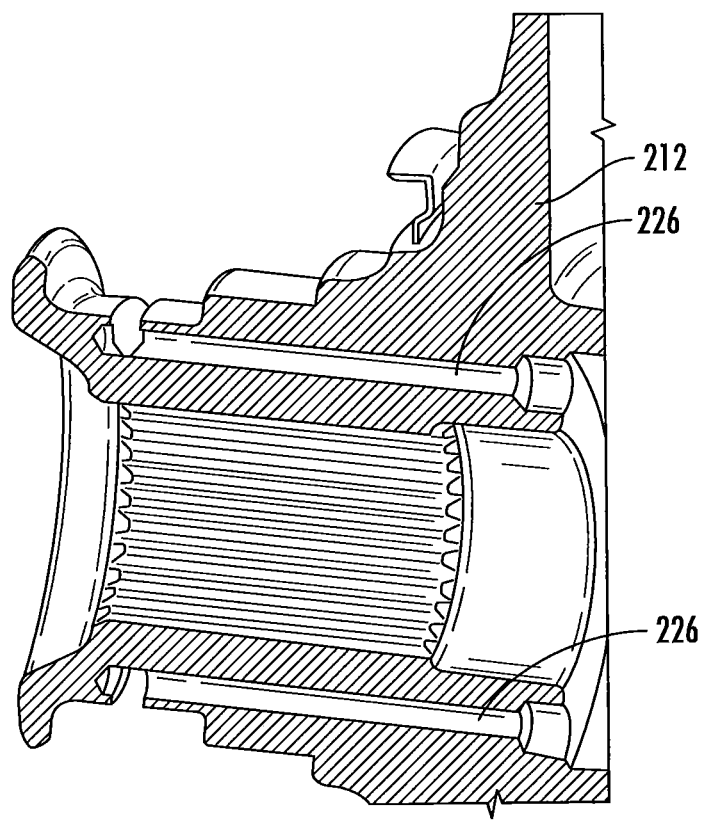
FIG. 4 is cross-sectional view of a portion of the wheel hub assembly of FIG. 2.

As illustrated in FIG. 3, the hub assembly 205 comprises an inner bearing flange 212. A radially inner surface 214 of the inner bearing flange 212 defines a plurality of splines 216 for engaging complimentary splines on spindle yoke 217 (see FIG. 10). In an embodiment, the inner bearing flange 212 defines multiple radially outer surfaces 218, 220, 222, 224. As illustrated in FIGS. 3 and 4, the inner bearing flange 212 also includes one or more fluid conduits 226.

Figure 5:
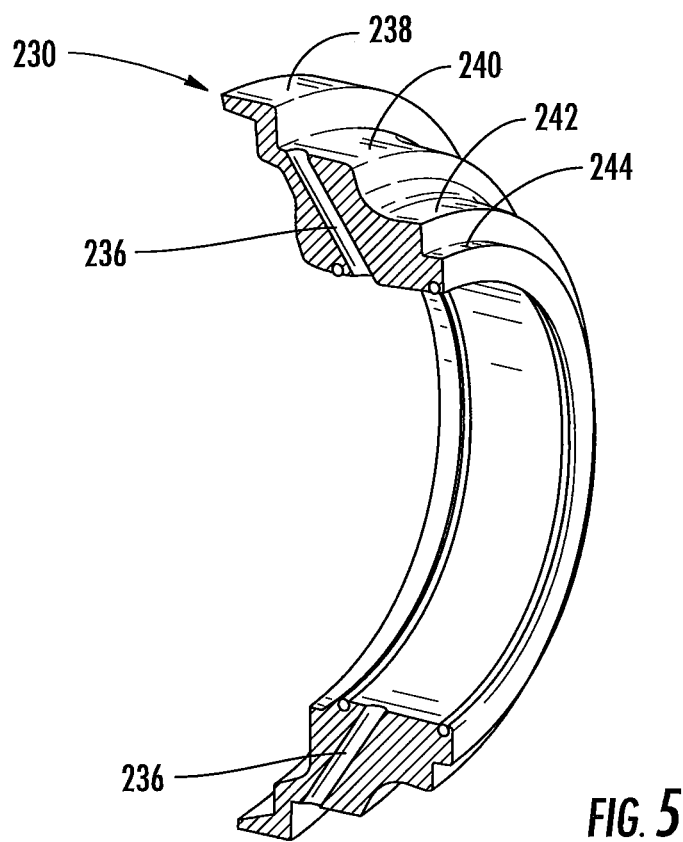
FIG. 5 is a cross-sectional view of another portion of the wheel hub assembly of FIG. 2.

Now referring to FIGS. 3 and 5, in an embodiment, an inner race 230 of the hub assembly 205 is coupled for rotation with the inner bearing flange first outer surface 218. A pair of O-ring seals 231 may be utilized to seal the fluid path between the inner bearing flange 212 and the inner race 230. An annular recess distinguished by a lip 232 and a shoulder 234 defines the first outer surface 218. The lip 232 is disposed at the inboard end of the inner bearing flange 212. The shoulder 234 is defined by the first outer surface 218 and the second outer surface 220. The second outer surface 220 has a diameter greater than the diameter of the first outer surface 218.

Figure 10:
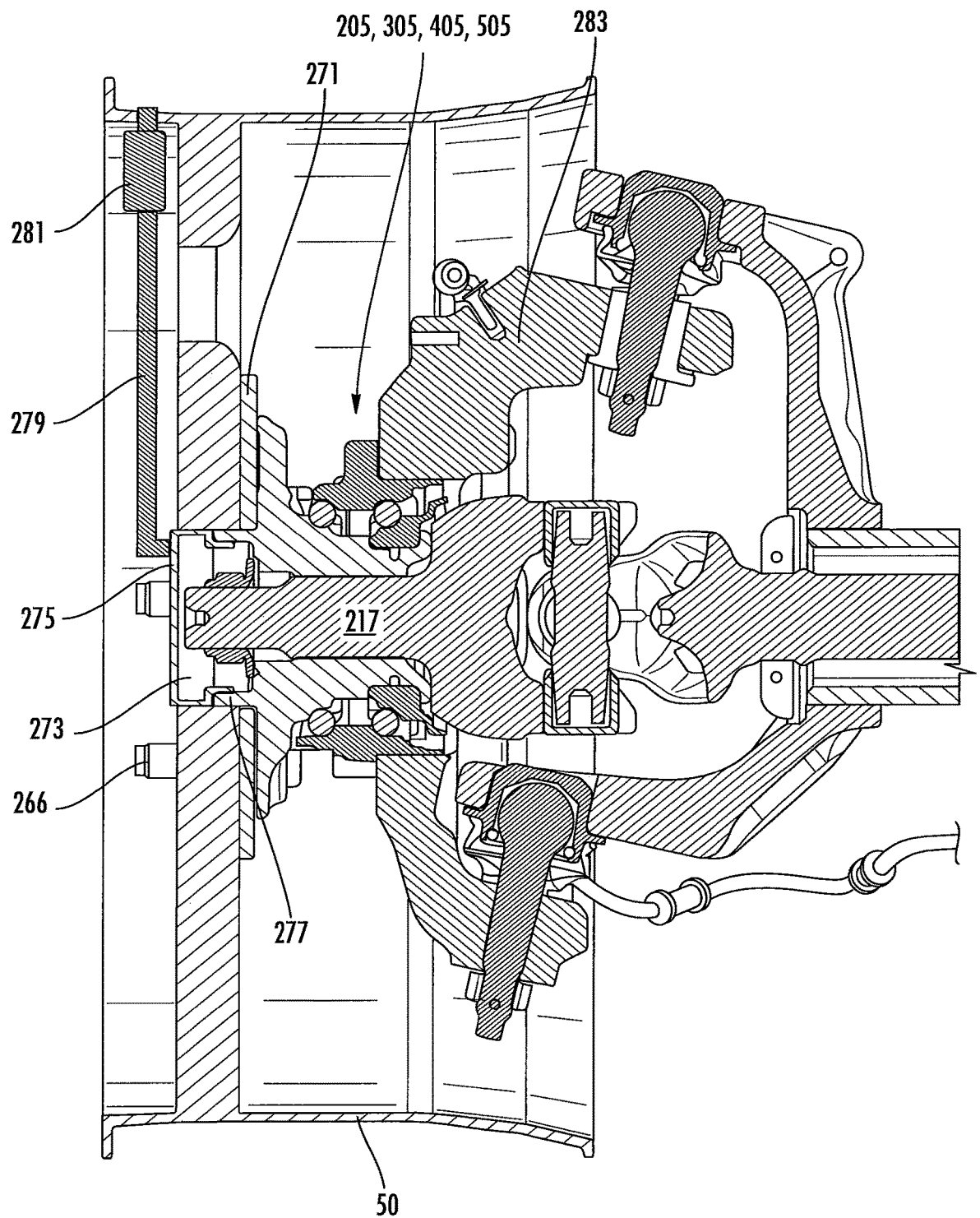
FIG. 10 is a cross-sectional view of a wheel end assembly of the tire inflation system of FIG. 1 according to an embodiment of the presently disclosed subject matter.

The inner race 230 comprises one or more fluid passages 236 in fluid communication with the inner bearing flange conduit 226. The inner race 230 includes multiple radially outer surfaces 238, 240, 242, 244. A first rotary air seal 246 is sealingly engaged between the inner race first outer surface 238 and a first portion of an outer bearing flange 250. The outer bearing flange 250 is radially disposed about the inner race 230 and the inner bearing flange 212. As illustrated in FIG. 10, the outer bearing flange 250 may be coupled with a steering knuckle 283 via mechanical fasteners. Referring back to FIG. 3, a second rotary air seal 248 is sealingly engaged between the inner race second outer surface 240 and a second portion of the outer bearing flange 250. The first and second rotary air seals 246, 248 define an annular chamber 257 between the inner race 230 and the outer bearing flange 250.

Figure 6:
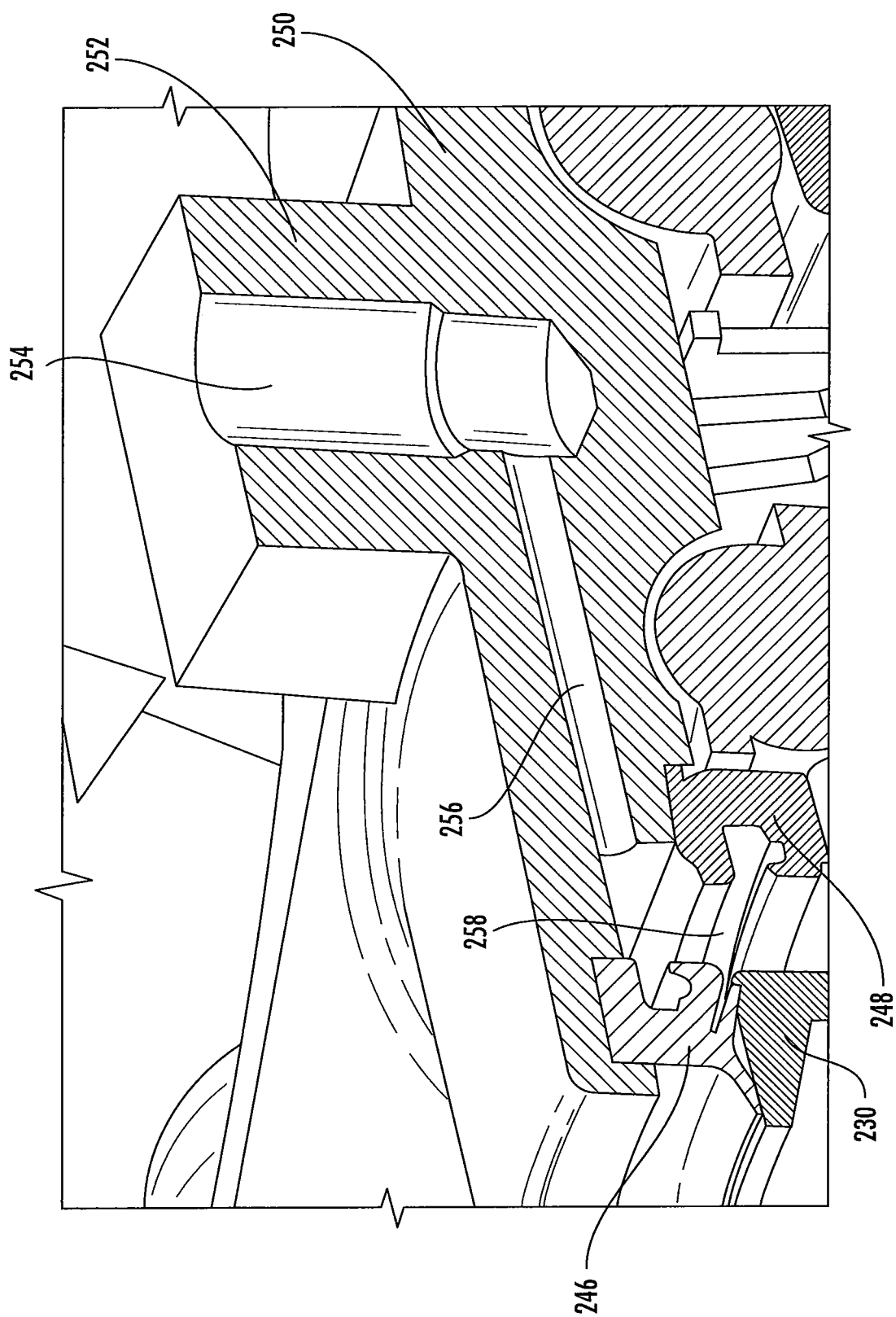
FIG. 6 is a cross-sectional view of still another portion of the wheel hub assembly of FIG. 2.

As illustrated in FIGS. 2, 3, and 6, a radially protruding rectangular portion 252 is disposed on the outer bearing flange 250. The rectangular portion 252 may be formed unitary and integral with the outer bearing flange 250. A port 254 extends generally radially into said rectangular portion 252. The port 254 is in fluid communication with one or more fluid conduits 256. The fluid conduits 256 extend generally parallel with a longitudinal axis of the hub assembly 205 in an inboard direction to the annular chamber 257. The one or more fluid conduits 256 place the port 254 in fluid communication with the fluid passages 236 in the inner race 230 via the annular chamber 257.

A first rolling element 258 is disposed adjacent to an outboard side of the second rotary air seal 248. The first rolling element 258 is disposed about the inner race third outer surface 242, between the inner race 230 and the outer bearing flange 250. A second rolling element 260 is disposed about the inner bearing flange third outer surface 222, between the inner bearing flange 212 and the outer bearing flange 250. In an embodiment, the first and second rolling elements 258, 260 may comprise a plurality of balls.

The inner bearing flange 212 further comprises a flange 262 located at an outboard end thereof. The outboard flange 262 includes a plurality of axially extending apertures 264 therethrough. A plurality of studs 266 are disposed in the apertures 264 by which a wheel 50 and/or a rotor 271 may be coupled with the hub assembly 205 (see FIG. 10). As illustrated in FIGS. 2 and 3, an oil seal 268 may be located between an outboard end of the outer bearing flange 250 and an inboard surface of the flange 262.

Now referring to FIGS. 3 and 10, in an embodiment, the inner bearing flange conduit 226 is in fluid communication with a chamber 273. The chamber 273 is defined by a hubcap 275 coupled with an outboard flange 277 of the inner bearing flange 212. In an embodiment, the hubcap 275 may be coupled with the outboard flange 277 via threaded engagement. An O-ring may be disposed between the hubcap 275 and the wheel 50 to militate against pressurize fluid leaking to the atmosphere. Another O-ring may be disposed between the hubcap 275 and the outboard flange 277 to prevent pressurized fluid from leaking to the atmosphere. A hose 279 may be coupled with an outboard surface of the hubcap 275 at a first end thereof. The hose 279 may be coupled with a radially inner surface of the wheel 50 at a second end thereof. A wheel valve 281 may be disposed in the fluid path of the hose 279 for selective fluid communication between the chamber 273 and the wheel 50.

In addition, the inner bearing flange lip 232 may abut the spindle yoke 217. Any pressurized fluid passing from the chamber 273 through the splined engagement of the spindle yoke 217 and the inner bearing flange 212 will not escape to the atmosphere because of the sealing engagement between the spindle yoke 217 and the lip 232. A sealing ring may be utilized to seal the spindle yoke 217 and the lip 232.

Figure 11:
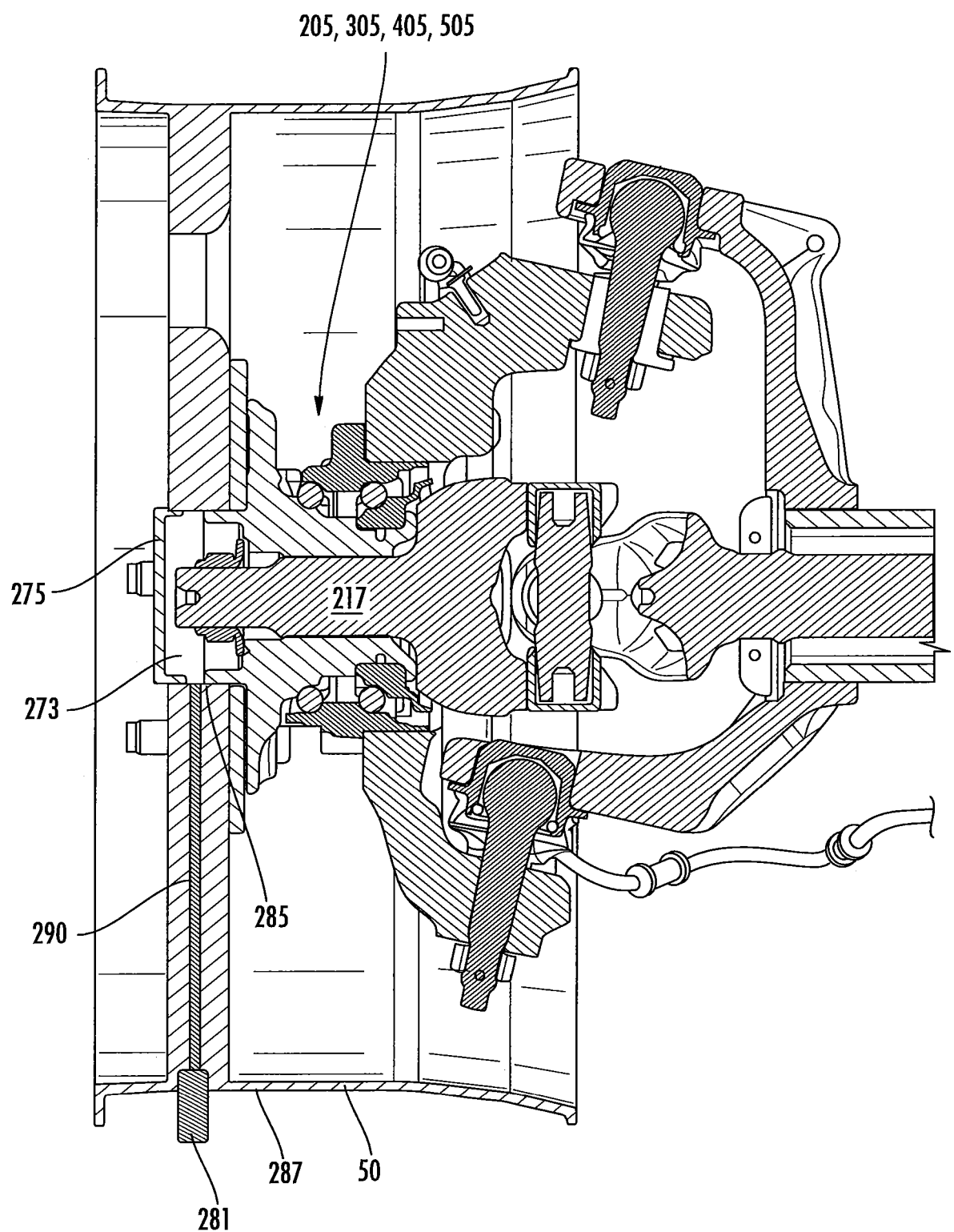
FIG. 11 is a cross-sectional view of a wheel end assembly of the tire inflation system of FIG. 1 according to another embodiment of the presently disclosed subject matter.

In an embodiment, as illustrated in FIG. 11, the hubcap 275 may be coupled with the wheel 50 via threaded engagement. One or more O-rings may be utilized to prevent the undesired transfer of pressurized fluid from the chamber 273 to the atmosphere, as described above. The chamber 273 may be in fluid communication with the wheel 50 via a wheel rim conduit 290. The wheel rim conduit 290 extends radially from a wheel rim inner surface 285 which at least partially defines the chamber 273, to a radially outer surface 287. The wheel valve 281 may be disposed in the fluid path of the wheel rim conduit for selective fluid communication between the chamber 273 and the wheel 50. In this embodiment, no hose is necessary to communicate fluid from the hub assembly 205 to the wheel 50.

Figure 12:
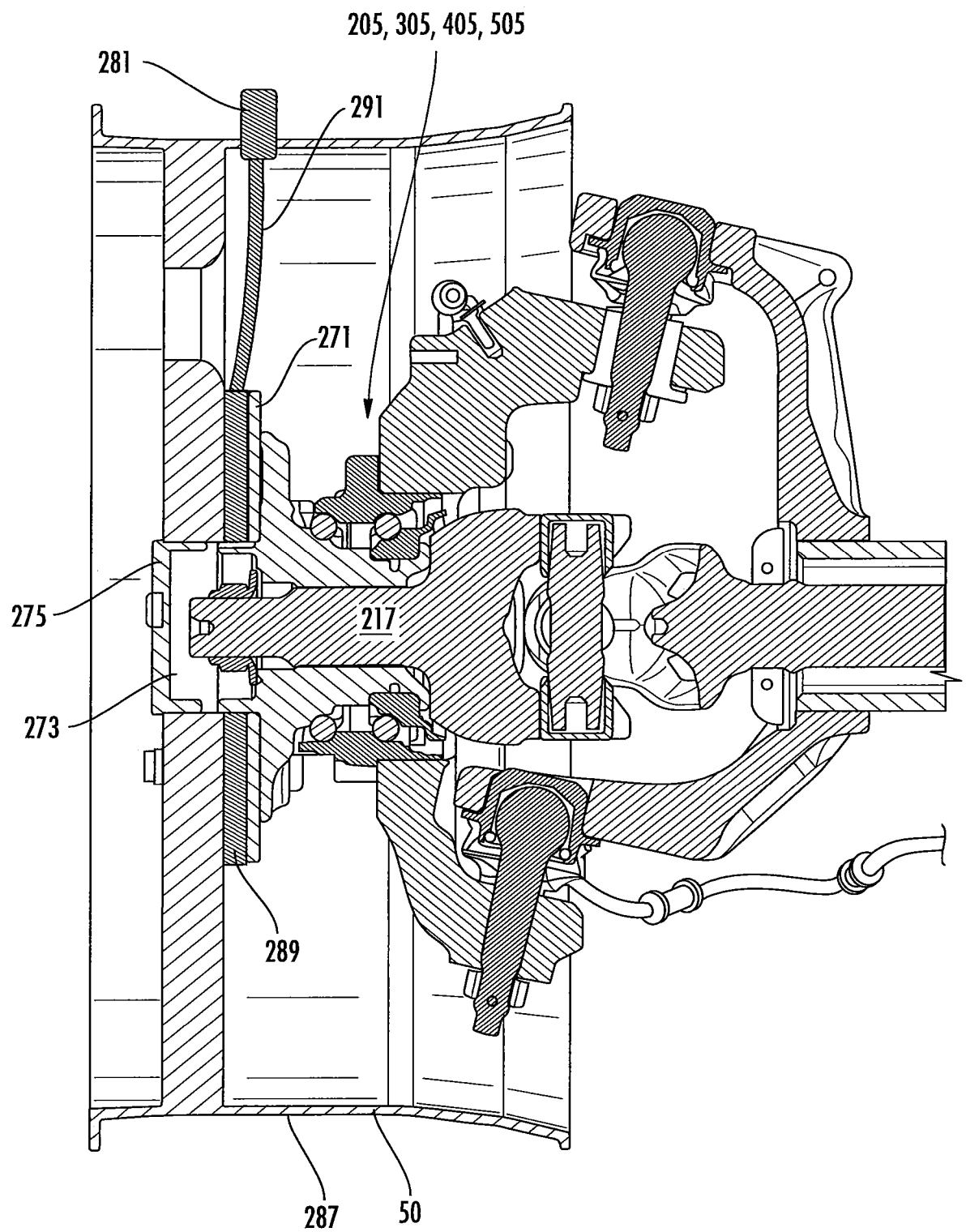
FIG. 12 is a cross-sectional view of a wheel end assembly of the tire inflation system of FIG. 1 according to yet another embodiment of the presently disclosed subject matter.

In still another embodiment, as illustrated in FIG. 12, the chamber 273 is in fluid communication with a circular manifold 289. The circular manifold 289 may be coupled with the rotor 271 and the wheel 50. In an embodiment, the circular manifold 289 is disposed about the inner bearing flange outboard flange 277. A hose 291 may be coupled with, and in fluid communication with, the circular manifold 289. The hose 291 may also be coupled with the wheel 50. In addition, the wheel valve 281 may be disposed in the fluid path of the hose 291 for selective fluid communication between the chamber 273 and the wheel 50.

Figure 7:
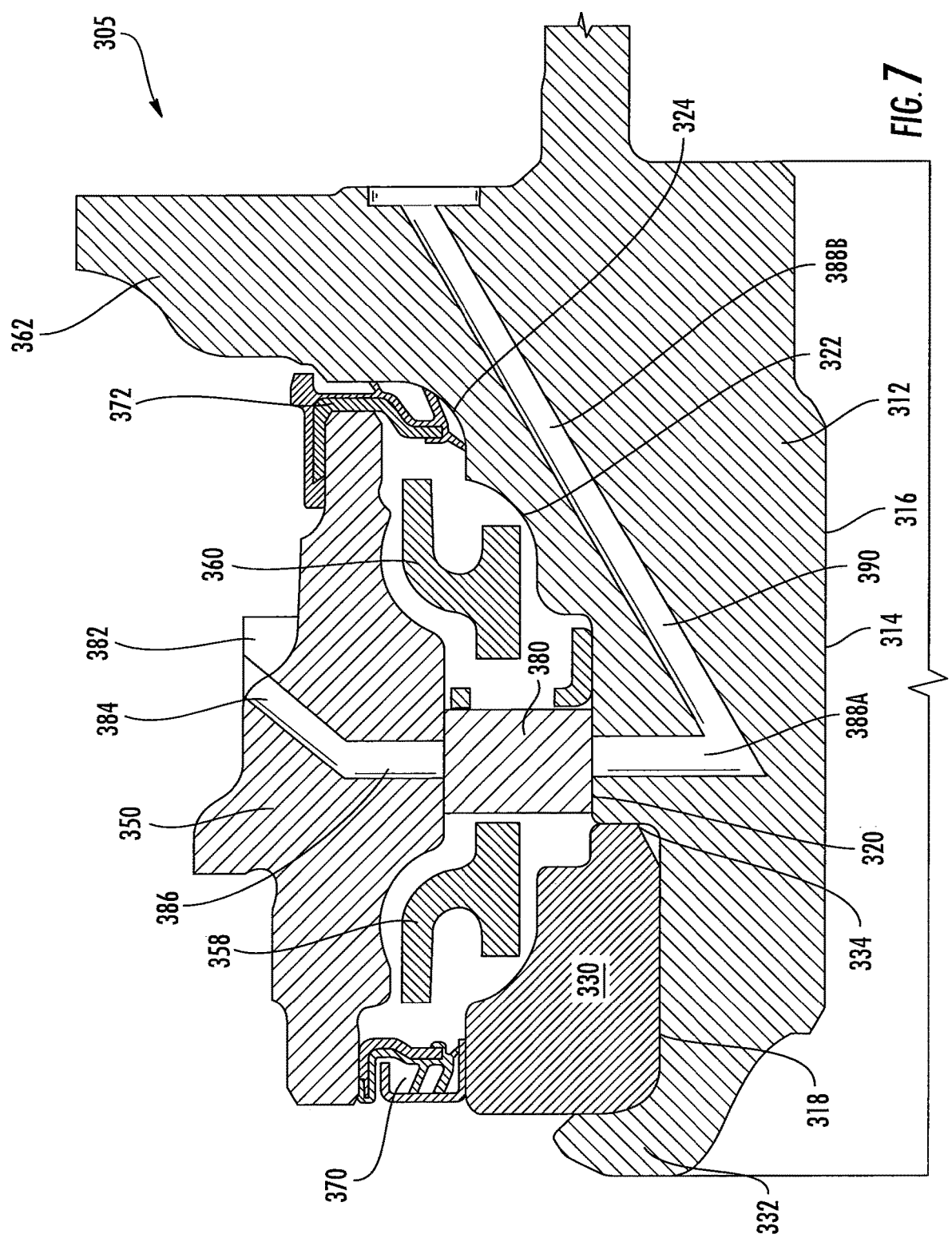
FIG. 7 is a cross-sectional view of a portion of a wheel hub assembly according to another embodiment of the tire inflation system of FIG. 1.

In an embodiment, as illustrated in FIG. 7, the wheel end assembly 200 may comprise a hub assembly 305. The hub assembly 305 comprises an inner bearing flange 312 having an inner surface 314. The inner surface 314 includes a plurality of splines 316 for engaging complimentary splines on a spindle yoke 217 (see FIG. 10). The inner bearing flange 312 also includes multiple radially outer surfaces 318, 320, 322, 324. An annular recess defines the first outer surface 318; the annular recess is distinguished by an inboard lip 332 and a shoulder 334. The second outer surface 320 has a greater diameter than the first outer surface 318, thereby defining the shoulder 334.

An inner race 330 is coupled with the first outer surface 318 in the annular recess. An outer bearing flange 350 is disposed about the inner race 330 and the inner bearing flange 312. As illustrated in FIG. 10, the outer bearing flange 350 may be coupled with a steering knuckle 283 via mechanical fasteners. Referring back to FIG. 7, a first rolling element 358 may be located between the inner race 330 and the outer bearing flange 350. A second rolling element 360 may be located between the inner bearing flange third outer surface 322 and the outer bearing flange 350. A first rotary lubricant seal 370 may be disposed inboard the first rolling element 358 between the inner race 330 and the outer bearing flange 350. A second rotary lubricant seal 372 may be disposed outboard the second rolling element 360 between the inner bearing flange outer fourth outer surface 324 and the outer bearing flange 350. The second rotary lubricant seal 372 may also be disposed between an outboard end of the outer bearing flange 350 and a radially extending flange 362 of the inner bearing flange 312. The first and second rotary lubricant seals 370, 372 militate against lubricant escaping the bearing assembly 310.

The bearing assembly 310 may further comprise an annular seal assembly 380 disposed about the inner bearing flange second outer surface 320 between the first and second rolling elements 358, 360. The annular seal assembly 380 is in sealing engagement with the inner bearing flange 312 and the outer bearing flange 350. In an embodiment, the annular seal assembly 380 may comprise two separate radial lip seals defining a radial fluid chamber therebetween. In another embodiment, the annular seal assembly 380 may comprise a one-piece cartridge assembly defining a fluid channel having a U-shaped cross section. In yet another embodiment, the annular seal assembly 380 may comprise two flat face contact radial polytetrafluoroethylene ("PTFE") seal rings.

The outer bearing flange 350 may further comprise a radially extending rectangular protrusion 382 on an outer surface thereof. The rectangular protrusion 382 includes a port 384 in fluid communication with a first fluid conduit 386. The port 384 may be disposed through the rectangular protrusion 382 at a diagonal extending from the rectangular protrusion 382 in an inboard direction. The first fluid conduit 386 may extend radially from the port 384 to the seal assembly 380. The seal assembly 380 is in fluid communication with a second fluid conduit 390. The second fluid conduit 390 comprises a first portion 388A which radially extends into the inner bearing flange second outer surface 320 toward the inner bearing flange inner surface 314. A second portion 388B of the second fluid conduit 390 is in fluid communication with the second fluid conduit first portion 388A. The second fluid conduit second portion 388B may extend diagonally in the inner bearing flange 312 from the second fluid conduit first portion 388A to an outboard surface of the flange 362.

Figure 8:
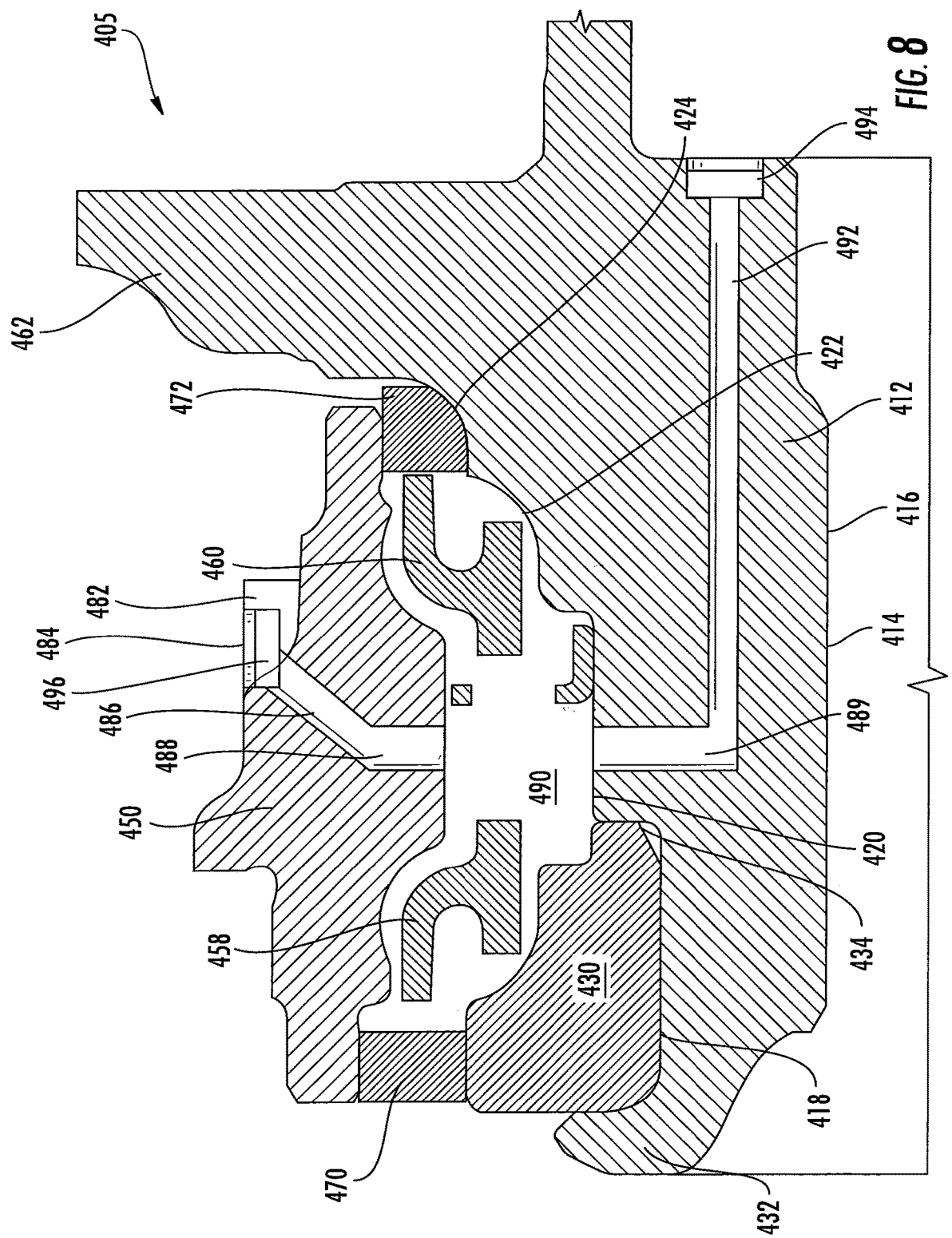
FIG. 8 is a cross-sectional view of a portion of a wheel hub assembly according to yet another embodiment of the tire inflation system of FIG. 1.

In another embodiment, as illustrated in FIG. 8, a hub assembly 405 comprises an inner bearing flange 412 having a splined inner surface 414. That is, the inner surface 414 includes a plurality of splines 416 for engaging complimentary splines on a spindle yoke 217 (see FIG. 10) for rotation therewith. The inner bearing flange 412 also includes multiple radially outer surfaces 418, 420, 422, 424. The first outer surface 418 may be defined by an inboard lip 432 and a shoulder 434. The second outer surface 420 has a greater diameter than the first outer surface 418, creating the shoulder 434.

An inner bearing race 430 is coupled with the first outer surface 418 of the inner bearing flange 412. An outer bearing flange 450 is disposed about the inner bearing race 430 and the inner bearing flange 412. As illustrated in FIG. 10, the outer bearing flange 450 may be coupled with a steering knuckle 283 via mechanical fasteners. Referring back to FIG. 8, a first rolling element 458 may be disposed between the inner bearing race 430 and the outer bearing flange 450. A second rolling element 460 may be disposed between the hub third outer surface 422 and the outer bearing flange 450.

A first rotary seal 470 may be disposed inboard the first rolling element 458 between the inner bearing race 430 and the outer bearing flange 450. A second rotary seal 472 may be disposed outboard the second rolling element 460 between the hub outer fourth outer surface 424 and the outer bearing flange 450.

The outer bearing flange 450 may comprise a radially extending rectangular protrusion 482 on an outer surface thereof. The rectangular protrusion 482 includes a port 484 in fluid communication with a first fluid conduit 486. The port 484 may be disposed through the rectangular protrusion 482 at a diagonal extending from the rectangular protrusion 482 in an inboard direction. The first fluid conduit 486 may extend radially from the port 484 toward a second fluid conduit 488. The second fluid conduit 488 extends in a radial direction through the outer bearing flange 450. A third fluid conduit 489 extend through the inner bearing flange second outer surface 420 toward the inner bearing flange inner surface 414. The space defined by the first and second rotary seals 470, 472 is an annular chamber 490 in fluid communication with the second fluid conduit 488. The first and second rotary seals 470, 472 militate against lubricant and pressurized fluid escaping the bearing assembly 410.

The third fluid conduit 489 is in fluid communication with the second fluid conduit 488 via the annular chamber 490. A fourth fluid conduit 492 is in fluid communication with the third fluid conduit 489. The fourth fluid conduit 492 may extend in an axial direction to an outboard surface of an inner bearing flange outboard flange 462.

In this embodiment, bearing lubricant may mix with the pressurized fluid delivered to the wheel 50. To prevent bearing lubricant from the annular chamber 490 from migrating to the wheel 50, a first lubricant trap 494 may be disposed in the fourth fluid conduit 492. In an embodiment, the first lubricant trap 494 may be disposed adjacent to an outboard surface of the hub flange 462. To prevent bearing lubricant from the annular chamber 490 from migrating into the fluid control circuit 40, a second lubricant trap 496 may be disposed in the port 484 adjacent the radially outer surface of the rectangular protrusion 482.

Figure 9:
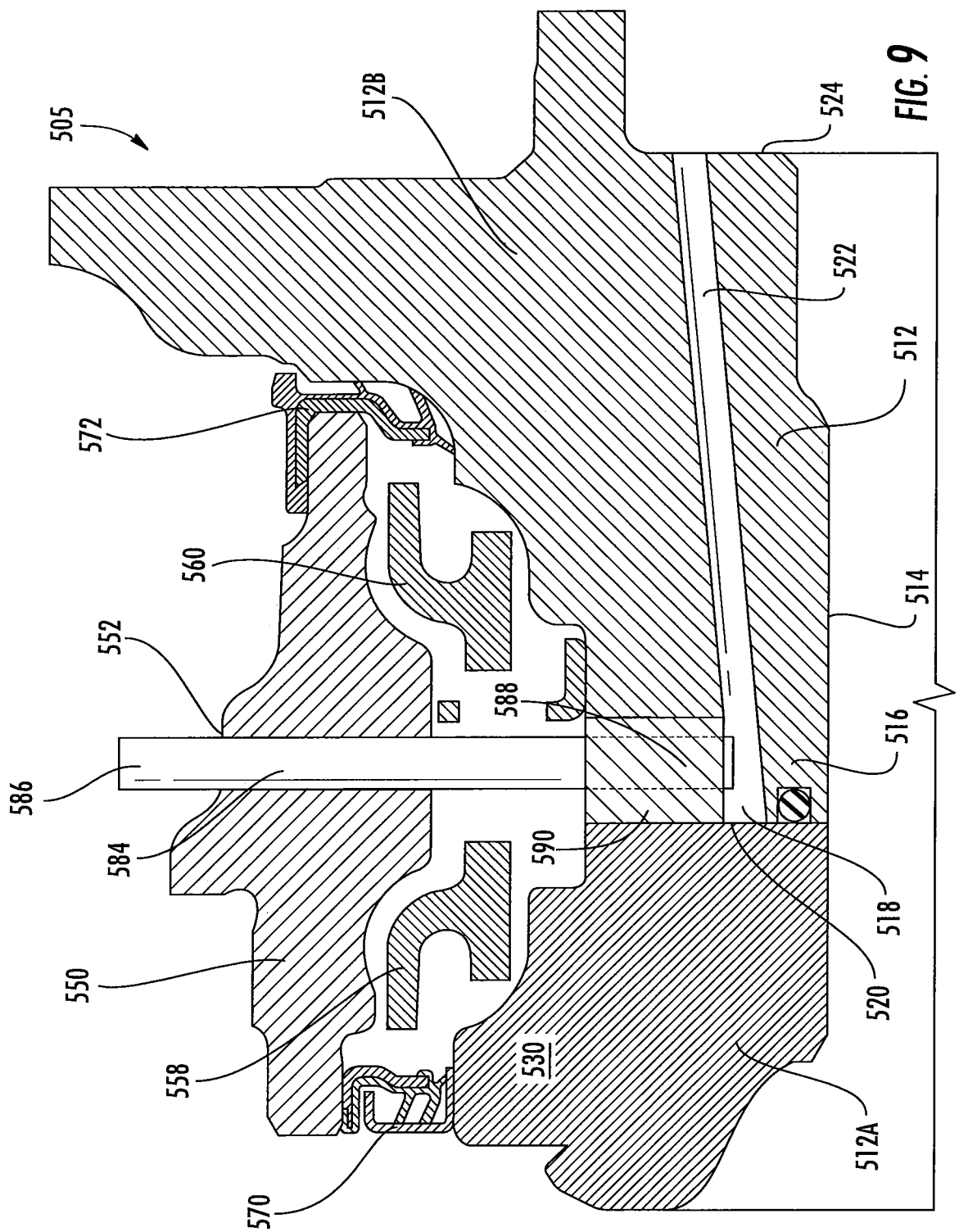
FIG. 9 is a cross-sectional view of a portion of a wheel hub assembly according to still another embodiment of the tire inflation system of FIG. 1.

In another embodiment, as illustrated in FIG. 9, the hub assembly 505 comprises an inner bearing flange 512 having a first portion 512A and a second portion 512B. The inner surface 514 includes a plurality of splines for engaging complimentary splines on a spindle yoke 217 (see FIG. 10). The first inner bearing flange portion 512A includes an inner bearing race portion 530. The inner bearing race portion 530 is disposed about the radially outer surface of the first inner bearing flange portion 512A. The second inner bearing flange portion 512B defines an axially extending annular flange 516 at an inboard end thereof. The first and second inner bearing flange portions 512A, 512B may be coupled together via one or more fasteners (not depicted). An annular recess 518 is defined by an outboard surface 520 of the first inner bearing flange portion 512A and the axially extending flange 516 of the second inner bearing flange portion 512B. A fluid conduit 522 extends in a generally axial direction from the annular recess 518 through an outboard surface 524 of the second inner bearing flange portion 512B.

The bearing assembly 510 also includes an outer bearing flange 550 disposed about the inner bearing flange 512. The outer bearing flange 550 may be fixedly coupled with a steering knuckle 283 (see FIG. 10) via, for example, mechanical fasteners. A first rolling element 558 and a second rolling element 560 may be disposed between the inner bearing flange 512 and the outer bearing flange 550 such that the inner bearing flange 512 may rotate relative to the outer bearing flange 550. A first rotary seal 570 may be disposed between the inner bearing flange 512 and the outer bearing flange 550 at an inboard end thereof. A second rotary seal 572 may be disposed between the inner bearing flange 512 and the outer bearing flange 550 at an outboard end thereof. The first and second rotary seal 570, 572 militate against bearing lubricant exiting the bearing assembly 510.

The outer bearing flange 550 comprises an aperture 552 disposed therethrough from a radially outer surface of the outer bearing flange 550 to a radially inner surface of the outer bearing flange 550. In an embodiment, the aperture 552 is disposed through the inner surface of the outer bearing flange 550 between the first and second rolling elements 558, 560. A tubular fluid conduit 584 is disposed through the aperture 552. A first end 586 of the tubular fluid conduit 584 is in fluid communication with the fluid control circuit 40. A second end 588 of the tubular fluid conduit 584 is disposed through a seal assembly 590 in the annular recess 518. The tubular fluid conduit 584 is in fluid communication with the annular recess 518.

In an embodiment, the seal assembly 590 may comprise an axial face seal assembly. An outer surface of the tubular fluid conduit 584 is sealingly coupled with the outer bearing flange 550 and with the seal assembly 590.

Figure 13:
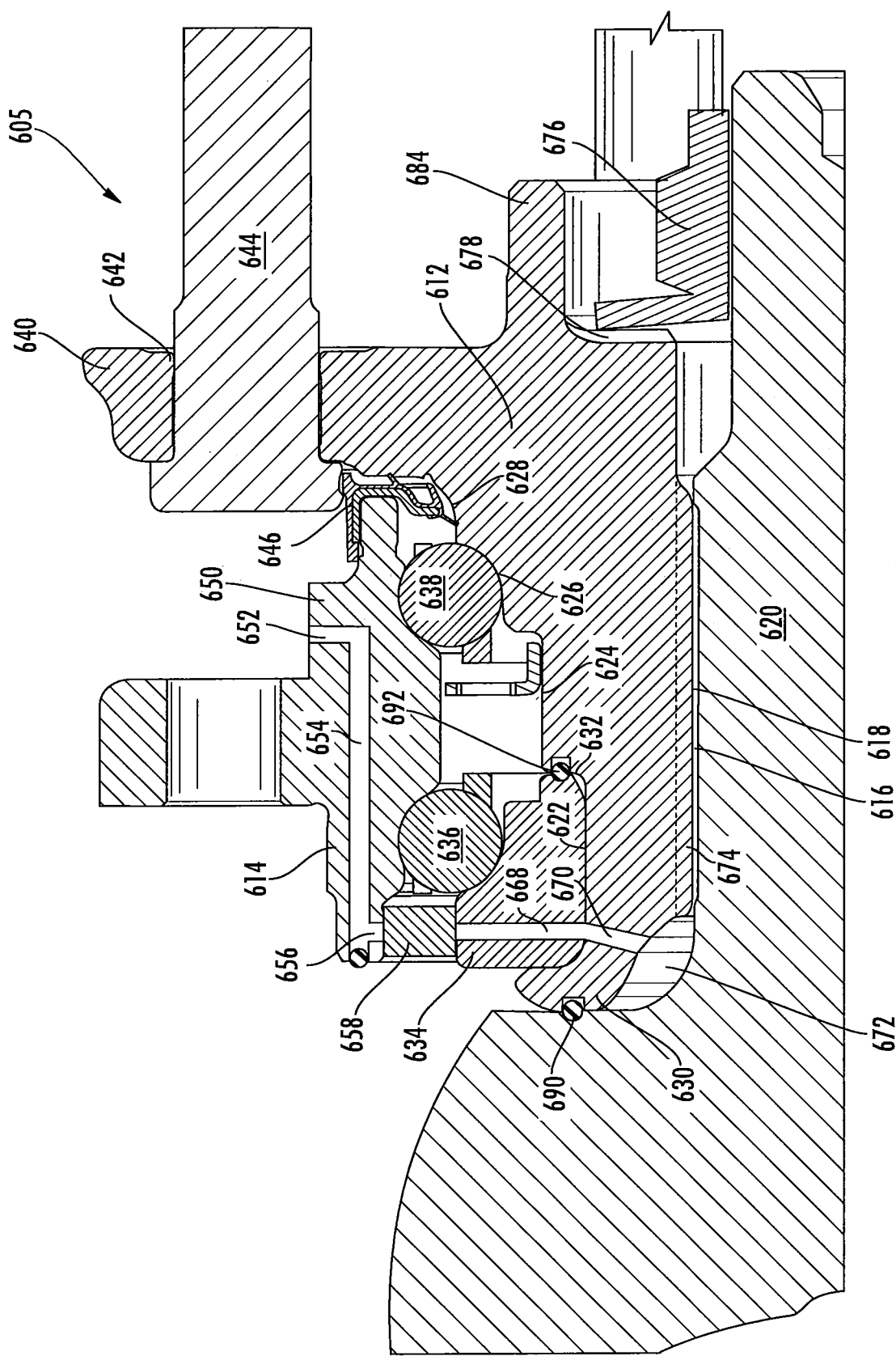
FIG. 13 is a cross-sectional view of a portion of a wheel hub assembly of the tire inflation system of FIG. 1 according to another embodiment of the presently disclosed subject matter.

As illustrated in FIG. 13, in an embodiment, the wheel end assembly 200 may comprise a hub assembly 605. The hub assembly 605 comprises an inner bearing flange 612 and an outer bearing flange 614. A radially inner surface 616 of the inner bearing flange 612 defines a plurality of splines 618 for engaging complimentary splines on a spindle yoke 620. In an embodiment, the inner bearing flange 612 defines multiple radially outer surfaces 622, 624, 626, 628.

The first outer surface 622 is defined by an annular recess distinguished by a lip 630 and a shoulder 632. The lip 630 is disposed at the inboard end of the inner bearing flange 612. The shoulder 632 is defined by the first outer surface 622 and the second outer surface 624. The second outer surface 624 having a diameter greater than the diameter of the first outer surface 622. The hub assembly 605 further comprises an inner bearing race 634 disposed about and coupled with the inner bearing flange first outer surface 622 for rotation therewith.

A first rolling element 636 is disposed about the inner bearing race 634, between the inner race 630 and the outer bearing flange 614. A second rolling element 638 is disposed about the inner bearing flange third outer surface 626, between the inner bearing flange 612 and the outer bearing flange 614. In an embodiment, the first and second rolling elements 636, 638 may comprise a plurality of balls.

The inner bearing flange 612 further comprises a flange 640 located at an outboard end thereof. The outboard flange 640 includes a plurality of axially extending apertures 642 disposed therethrough. A plurality of studs 644 are disposed in the apertures 642 by which a wheel 50 and/or a rotor (not depicted) may be coupled with the hub assembly 605. An oil seal 646 may be located between an outboard end of the outer bearing flange 614 and an inboard surface of the outboard flange 640.

The outer bearing flange 614 is radially disposed about the inner bearing race 634 and the inner bearing flange 612. The outer bearing flange 614 may be coupled with a steering knuckle (not depicted) via mechanical fasteners. A radially protruding rectangular portion 650 is disposed on the outer bearing flange 614. In an embodiment, the rectangular portion 650 may be formed unitary and integral with the outer bearing flange 614. A port 652 extends generally radially into said rectangular portion 650. The port 652 is in fluid communication with one or more fluid conduits 654. The fluid conduits 654 extend generally parallel with a longitudinal axis of the hub assembly 605 in an inboard direction. The fluid conduits 654 place the port 652 in fluid communication with one or more radially inward extending fluid passages 656 in the outer bearing flange 614.

As illustrated in FIGS. 13 and 4, a rotary seal assembly 658 is disposed between the outer bearing flange 614 and the inner bearing race 634, outboard the first rolling element 636. The rotary seal assembly 658 comprises first and second rotary air seals 660, 662 defining an annular chamber 657 between the inner bearing race 634 and the outer bearing flange 614. The rotary seal assembly 658 may also comprise a ring 666 disposed between the first and second rotary air seals 660, 662 and the inner bearing race 634. The ring 666 may comprise a portion 667 disposed about an outboard surface of the inner bearing race 634.

Additionally, the inner bearing race 634 comprises one or more fluid passages 668 in fluid communication with the annular chamber 657. The one or more fluid passages 668 are in fluid communication with one or more fluid passages 670 disposed through the inner bearing flange 612. The inner bearing flange 612 and the spindle yoke 620 define an annular chamber 672 therebetween. The annular chamber 672 is in fluid communication with the one or more fluid passages 668 through the inner bearing flange 612.

Figure 14:
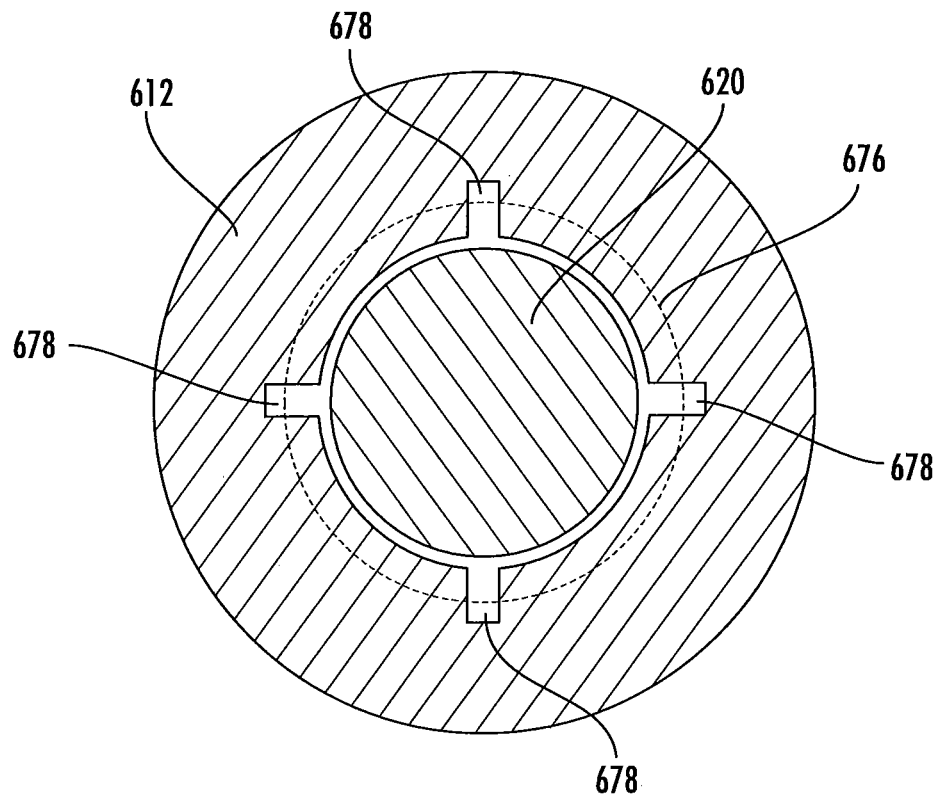
FIG. 14 illustrates a cross-sectional view of a portion of the wheel hub assembly of FIG. 13.
Figure 15:
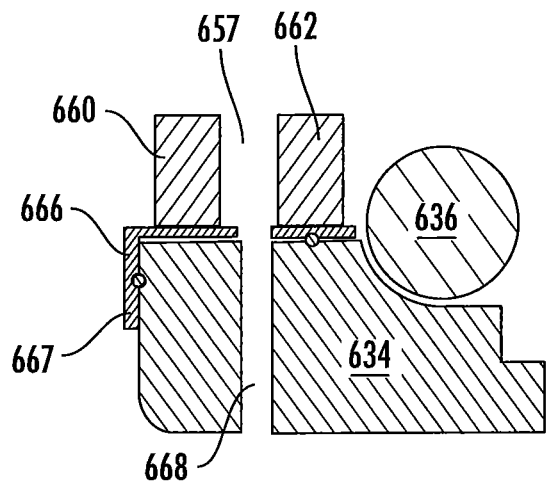
FIG. 15 is a cross-sectional view of another portion of the wheel hub assembly of FIG. 13.
Figure 16:
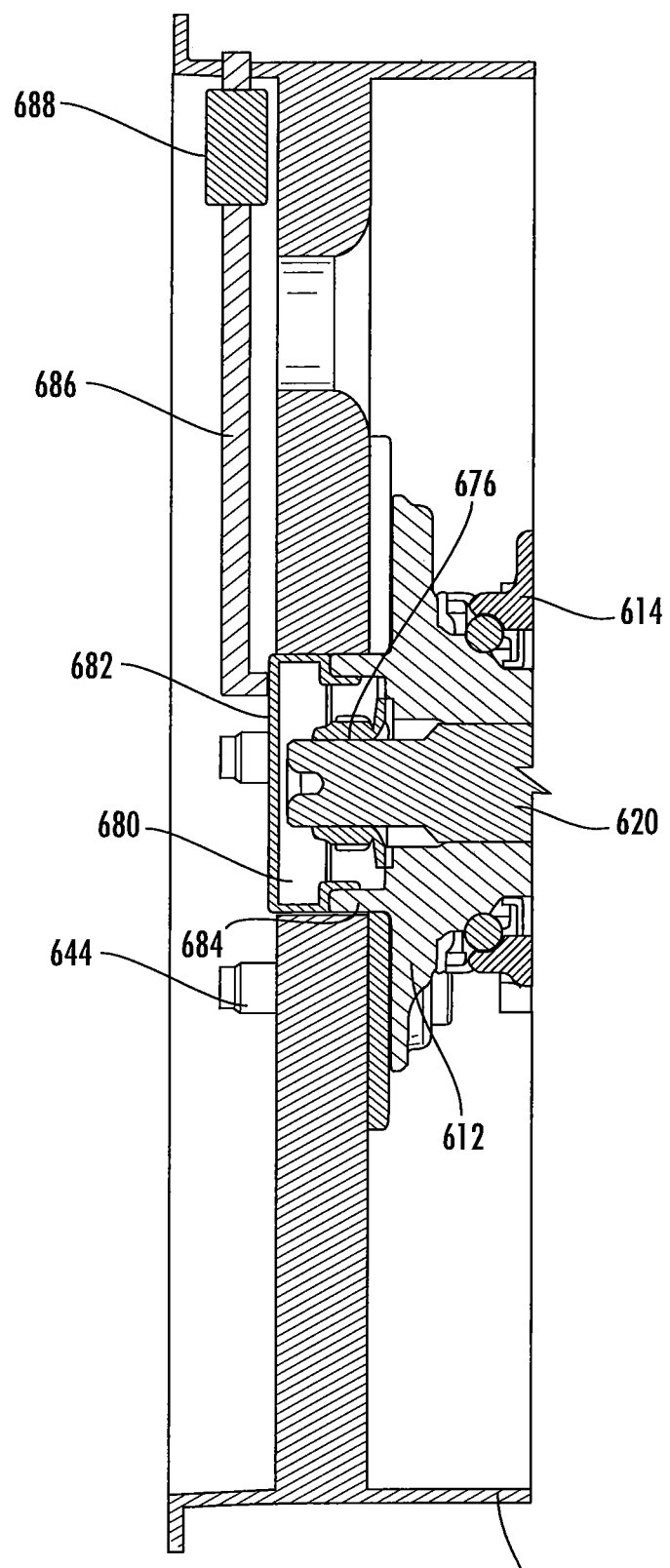
FIG. 16 is a cross-sectional view of a wheel end assembly of the tire inflation system of FIG. 1 according to an embodiment of the presently disclosed subject matter.

One or more of the inner bearing flange splines 618 are removed, or absent, to create one or more fluid conduits 674 between the inner bearing flange 612 and the spindle yoke 220. In another embodiment, four of the splines 618 are blind splines which comprise the fluid conduits 674. Referring now to FIGS. 13, 14 and 16, an axle nut 676 may be coupled with the spindle yoke 620 and abut the inner bearing flange 612. In an embodiment, the axle nut 676 is fixedly engaged with the spindle yoke 620 via a threaded connection. The axle nut 676 retains the hub assembly 605 on the spindle yoke 620.

One or more grooves 678 may be disposed in an outboard surface of the inner bearing flange 612 where the axle nut 676 abuts the inner bearing flange 612. The one or more grooves 678 place the fluid conduits 674 in fluid communication with a hub chamber 680. The hub chamber 680 is defined by a hubcap 682 coupled with an axially extending annular flange 684 on the inner bearing flange 612. In an embodiment, the hubcap 682 may be coupled with the annular flange 684 via threaded engagement. An O-ring (not depicted) may be disposed between the hubcap 682 and the wheel 50 to militate against pressurized fluid leaking to atmosphere. Another O-ring (not depicted) may also be disposed between the hubcap 682 and the annular flange 684 to prevent pressurized fluid from leaking to atmosphere.

A hose 686 has a first end coupled with the hubcap 682. A second end of the hose 686 may be coupled with a radially inner surface of the wheel 50, placing the hose in fluid communication with the tire. A wheel valve 688 may be disposed in the fluid path of the hose 686 to provide selective fluid communication between the chamber 680 and the tire of wheel 50.

As illustrated in FIG. 13, the inner bearing flange lip 630 abuts the spindle yoke 620 to create the chamber 672. Any pressurized fluid passing from the chamber 672 through the splined engagement of the spindle yoke 620 and the inner bearing flange 612 does not escape to the atmosphere because of the sealing engagement between the spindle yoke 620 and the lip 630. A first sealing ring 690 may be utilized to seal the spindle yoke 620 and the lip 630. A second sealing ring 692 may be disposed between the inner bearing race 634 and the inner bearing flange shoulder 632. The second sealing ring 692 mitigates against pressurized fluid communicating with the space between the first and second rolling elements 636, 638. In addition, a pressure activated air-tight adhesive may be disposed between the inner bearing flange lip 630 and the inner bearing race 634.

In operation, pressurized fluid is communicated from the fluid reservoir 44 through the air supply circuit 38 to the control unit 14. From the control unit 14, pressurized fluid is communicated to the fluid control circuit 40. The fluid control circuit 40 is in fluid communication with the outer bearing flange port 652. Pressurized fluid from the port 652 is communicated to the tire via fluid conduits 654, the seal assembly 658, fluid conduits 668, 670, annular chamber 672, fluid conduits 674, grooves 678, chamber 680, and hose 686.

Figure 17:
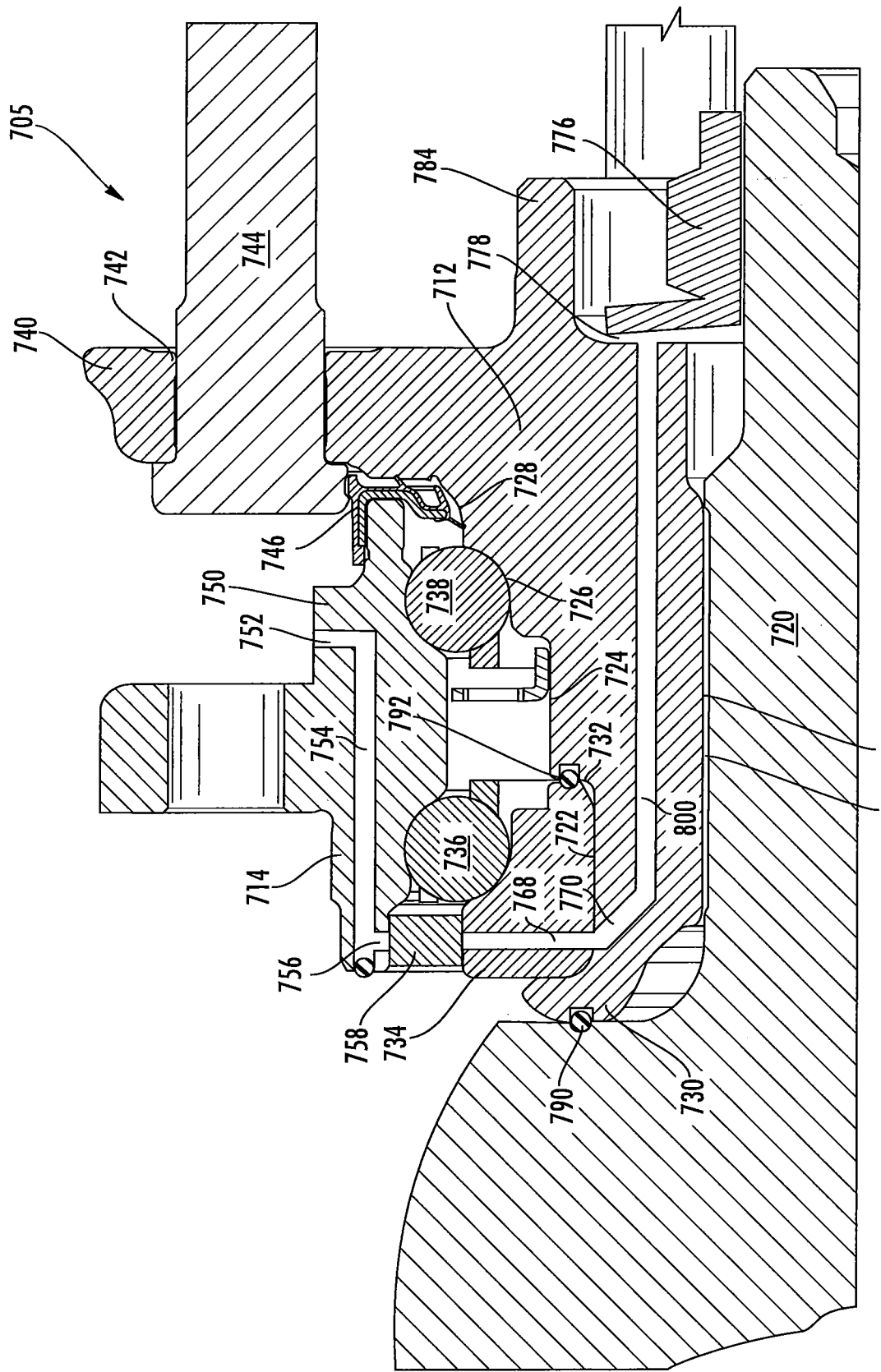
FIG. 17 is a cross-sectional view of a portion of a wheel hub assembly of the tire inflation system of FIG. 1 according to still another embodiment of the presently disclosed subject matter.

As illustrated in FIG. 17, in another embodiment, a hub assembly 705 may comprise features similar to the hub assembly 605; like elements are indicated by like reference numerals in the 700's. Namely, the elements indicated by the reference numerals 722, 724, 726, 728, 730, 732, 740, 742, 744, 746, 784, 790, and 792 in FIG. 17 may be as described for the elements indicated by the reference numerals 622, 624, 626, 628, 630, 632, 640, 642, 644, 646, 684, 690, and 692, respectively, in FIG. 13. The hub assembly 705 comprises an inner bearing flange 712 and an outer bearing flange 714. A radially inner surface 716 of the inner bearing flange 712 defines a plurality of splines 718 for engaging complimentary splines on a spindle yoke 720.

First and second rolling elements 736, 738 are disposed radially between the inner bearing flange 712 and the outer bearing flange 714. In an embodiment, the first and second rolling elements 736, 738 may comprise a plurality of balls.

The outer bearing flange 714 is radially disposed about the inner bearing race 734 and the inner bearing flange 712. The outer bearing flange 714 is coupled with a steering knuckle. A radially protruding rectangular portion 750 is disposed on the outer bearing flange 714. The rectangular portion 750 may be formed unitary and integral with the outer bearing flange 714. A port 752 extends generally radially into said rectangular portion 750. The port 752 is in fluid communication with one or more fluid conduits 754. The fluid conduits 754 extend generally parallel with a longitudinal axis of the hub assembly 705 in an inboard direction. The fluid conduits 754 place the port 752 in fluid communication with one or more radially inward extending fluid passages 756 in the outer bearing flange 714.

A rotary seal assembly 758 is disposed between the outer bearing flange 714 and the inner bearing race 734. Additionally, the inner bearing race 734 comprises one or more fluid passages 768 in fluid communication with the rotary seal assembly 758. The one or more fluid passages 768 are in fluid communication with one or more fluid passages 770 disposed through the inner bearing flange 712. The inner bearing flange 712 also comprises one or more fluid conduits 800. The one or more fluid conduits 800 extend generally parallel with a longitudinal axis of the inner bearing flange 712.

An axle nut 776 may be coupled with the spindle yoke 720 and abut the inner bearing flange 712. In an embodiment, the axle nut 776 is fixedly engaged with the spindle yoke 720 via a threaded connection. The axle nut 776 retains the hub assembly 705 on the spindle yoke 720.

One or more grooves 778 may be disposed in an outboard surface of the inner bearing flange 712 where the axle nut 776 abuts the inner bearing flange 712. The one or more grooves 778 place the fluid conduits 800 in fluid communication with the tire of wheel 50 via a wheel valve (not depicted). The pressurized fluid of the tire inflation system 10 may be communicated to the tire as described above with regards to the other embodiments described herein.

The specific features of the embodiments described herein may be combined and interchanged to create additional embodiments that are not depicted.

While various embodiments have been described above, it should be understood that they have been presented by way of example, and not limitation. It will be apparent to persons skilled in the relevant art that the disclosed subject matter may be embodied in other specific forms without departing from the spirit or essential characteristics thereof. The embodiments described above are therefore to be considered in all respects as illustrative, not restrictive.

What is claimed is:

1. A wheel hub assembly, comprising:
   a non-rotating outer bearing flange extending axially between an inboard end of the outer bearing flange and an outboard end of the outer bearing flange;
   an inner bearing flange disposed at least partially concentrically within said outer bearing flange, the inner bearing flange extending axially between an inboard end of the inner bearing flange and an outboard end of the inner bearing flange;
   at least one rolling element disposed radially between said outer bearing flange and said inner bearing flange;
   a fluid port disposed in said outer bearing flange;
   a first conduit disposed through said outer bearing flange in fluid communication with said fluid port and extending axially from the fluid port toward the inboard end of the outer bearing flange to an axial position that is axially closer to the inboard end of the outer bearing flange than any of the at least one rolling elements;
   a second conduit disposed through said inner bearing flange, wherein said second conduit is in fluid communication with said first conduit and extends axially toward the outboard end of the inner bearing flange; and
   a rotating spindle disposed at least partially through said inner bearing flange, wherein said spindle is coupled for rotation with said inner bearing flange about an axis of rotation of the inner bearing flange and spindle coupled thereto.

2. The wheel hub assembly of claim 1, further comprising:
   a steering knuckle coupled with said outer bearing flange.

3. The wheel hub assembly of claim 1, further comprising:
   an inner race disposed about said inner bearing flange, wherein said inner race defines a third conduit in fluid communication with said first and second fluid conduits.

4. The wheel hub assembly of claim 3, further comprising:
   a first rotary seal disposed radially between said outer bearing flange and said inner race;
   a second rotary seal disposed radially between said outer bearing flange and said inner race; and
   an annular chamber at least partially defined by said first and second rotary seals, wherein said annular chamber is in fluid communication with said first and third fluid conduits.

5. The wheel hub assembly of claim 1, wherein:
   a first plurality of splines are disposed on an outer surface of said spindle; and
   a second plurality of splines are disposed on an inner surface of said inner bearing flange, wherein said second plurality of splines are engaged with said first plurality of splines.

6. The wheel hub assembly of claim 1, wherein fluid passageways between the fluid port in the outer bearing flange and the second conduit through the inner bearing flange are configured to permit pressurized air to flow from the fluid port to a chamber at the outboard end of the inner bearing flange.

7. The wheel hub assembly of claim 6, wherein:
   the chamber surrounds an outboard end of the inner bearing flange from which the spindle extends.

8. The wheel hub assembly of claim 6, wherein:
   the chamber is defined by a hubcap coupled with an outboard flange of the inner bearing flange.

9. The wheel hub assembly of claim 1, further comprising:
   a first rotary seal disposed radially between said outer bearing flange and said inner bearing flange, wherein said first rotary seal is disposed about an inboard end of said inner bearing flange;
   a second rotary seal disposed radially between said outer bearing flange and said inner bearing flange, wherein said second rotary seal is disposed about an outboard end of said inner bearing flange; and
   an annular chamber formed between the first rotary seal and a third rotary seal disposed between the outer bearing flange and the inner bearing flange, wherein the annular chamber is in fluid communication with the fluid port via the first conduit.

10. The wheel hub assembly of claim 9, wherein said first and second conduits are in fluid communication with said annular chamber.

11. The wheel hub assembly of claim 9, wherein the annular chamber is in an axial position that is axially closer to the inboard end of the outer bearing flange than any of the at least one rolling elements.

12. The wheel hub assembly of claim 1, further comprising:
   an inner race disposed about said inner bearing flange, wherein said inner race defines a third conduit in fluid communication with said second conduit;

a seal assembly disposed radially between said outer bearing flange and said inner race, wherein said third conduit is in fluid communication with said first conduit via said seal assembly; and a chamber defined between said inner bearing flange and said spindle, wherein said second conduit is in fluid communication with said chamber.

13. The wheel hub assembly of claim 12, further comprising:

at least one blind spline defined by said inner bearing flange, wherein said chamber is in fluid communication with said blind spline.

14. The wheel hub assembly of claim 1, further comprising:

a hub cap coupled with said inner bearing flange, wherein said hub cap and said inner bearing flange define a chamber in fluid communication with said second conduit;

a hose in fluid communication with said chamber; and a tire in selective fluid communication with said hose.

\* \* \* \* \*